July 2, 1946.  M. S. KENWORTHY  2,403,086
ELECTRODE HOLDER
Filed April 29, 1944
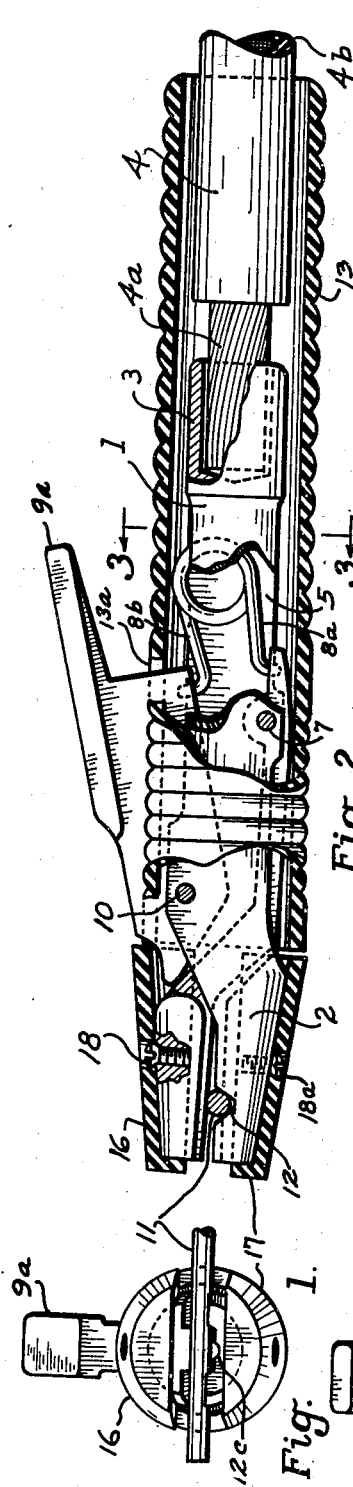
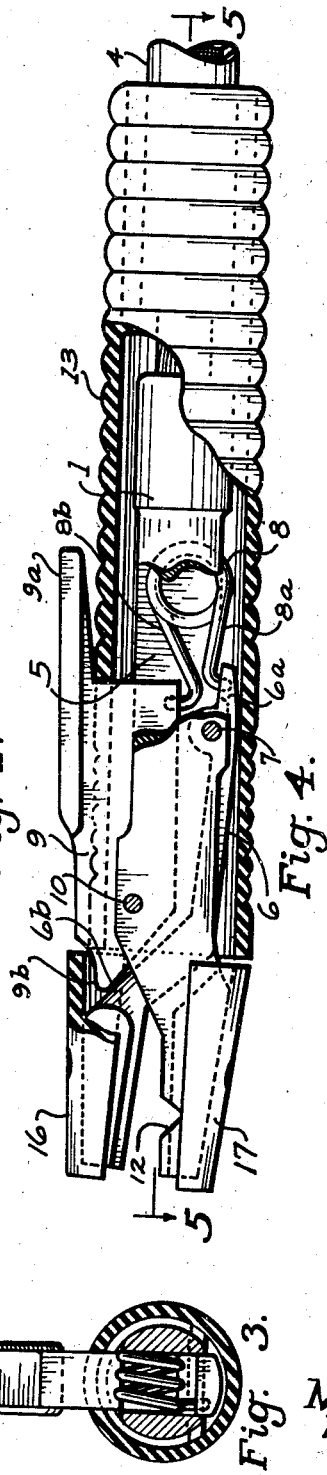
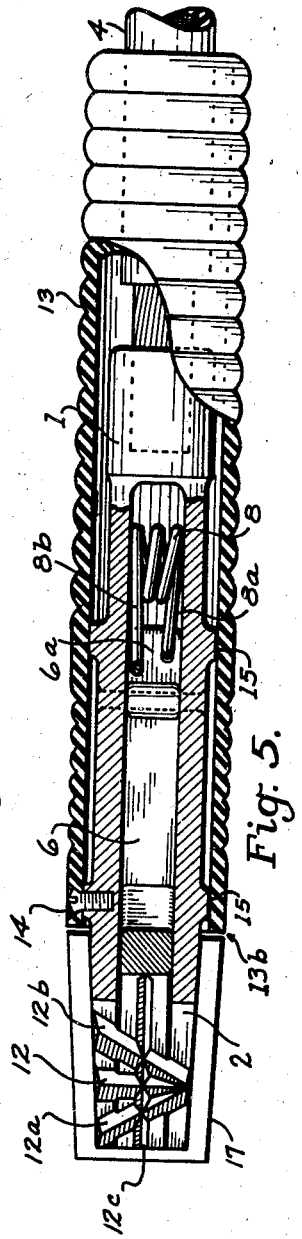
Inventor
Max S. Kenworthy
by
Attorney Patented July 2, 1946

2,403,086

UNITED STATES PATENT OFFICE 2,403,086

ELECTRODE HOLDER

Max S. Kenworthy, Portland, Oreg., assignor to C. L. Harsch, Portland, Oreg.

Application April 29, 1944, Serial No. 533,304

2 Claims. (Cl. 219—8)

My invention relates to electrode holders or so-called "stingers" adapted to hold a length of welding rod and to apply electric current therethru used in the art of electric welding. It is essential that the grip between the jaws of the holder and the welding rod be quite secure, not only to eliminate the chance of lateral movement, but also to maintain good electrical connection between the jaws and the welding rod to prevent arcing of the current at this point, which would tend to cause the welding rod to become welded to, or otherwise burn, the jaws of the stinger. The necessity for providing such structure causes said stingers to be quite stiff so that the jaws can be opened and the pressure relaxed on the welding rod only by the exercise of substantial strength. Much welding is now being done by women, and they do not have sufficient strength in their hands to manipulate said jaws. Efforts have been made to provide greater leverage for opening said jaws. This requires that the manipulative handles be made longer or the jaws shorter. The jaws must be arranged to accommodate a relatively wide range of sizes of welding rod, and, thus, if the jaws of a stinger are set to accommodate small-diameter rod, they tend to diverge when gripping larger rod with corresponding relaxation of effective mechanical grip and arcing between jaws and rod.

If the jaws are made longer to permit them to be opened to accommodate such a variance in size of welding rod, the handles must be also made longer, and this produces a heavy, cumbersome stinger which cannot be used in tight places and is so heavy that it makes the user's arm weary.

The principal object of my invention is to provide a stinger in which spring gripping pressure is applied to relatively long jaws and relaxing pressure is applied at a different point. Thus, a relatively stiff spring can be provided for closing said jaws and said spring can be overcome by the use of leverage applied to the opening handle so that the spring pressure can be overcome and the jaws opened with the exercise of substantially less force than is now necessary.

A further and more specific object of my invention is to provide a light-weight electrode holder of small compass and of simple and inexpensive construction adapted effectively to accommodate a relatively wide range of diameters of welding rod.

The details of my invention are hereinafter described with reference to the accompanying drawing, in which:

Fig. 1 is an end view of an electrode holder embodying my invention, showing a short section of welding rod gripped in the jaws thereof;

Fig. 2 is a side elevation of such electrode holder with portions shown broken away to disclose details of construction thereof, the jaws being shown in the position they occupy in gripping a section of welding rod;

Fig. 3 is a tranverse section through such electrode holder taken substantially on the line 3—3 in Fig. 2;

Fig. 4 is an elevation of such electrode holder with parts shown broken away to illustrate the position of the parts when the jaws are opened to receive and to release the grip on a section of welding rod; and Fig. 5 is a substantially a longitudinal section taken on the line 5—5 in Fig. 4.

An electrode holder embodying my invention comprises a jaw 1 made of copper or similar material, which is highly conductive of electricity. One end of said jaw is formed into a fixed jaw or gripping member 2. The other end has a socket 3 formed therein for receiving the bared end 4a of an electric cable 4. Said cable, of necessity, must be sheathed by a covering 4b, and the end is stripped of said sheathing so as to make a good electrical connection with said socket. There are many ways in which said cable end may be secured in the socket. The most common, I believe, is to solder or braze said cable end in place so as to provide a good mechanical bond between said parts and good electrical conduction therethru.

Said jaw, in the main, is cylindrical, and a slot 5 extending diametrically therethru is formed intermediate the ends. A movable jaw member 6 is relatively narrow and fits closely within said slot. Said members 1 and 6 are pivotally joined together by a pin 7 or other connecting member, so that they are arranged scissors-fashion.

I preferably only form a lug 6a at the right-hand side of the pin 7, as viewed in Figs. 2, 4 and 5 to engage one arm 8a of a coil spring 8. Said coil spring and said arm are arranged within the slot 5 and are positioned to open said jaws. The short length of the lug 6a limits the pressure which is applied to relax said jaws.

Also pivotally mounted in the slot 5 of jaw 1 is an operating handle or lever 9. It is joined to the jaw 2 by a pivot member 10. Said member 10 preferably is made of, or is sheathed with, electrically non-conductive material, so that it will not transmit current from the jaws to the exterior of the electrode holder. The portion of the said handle or lever 9, which extends outwardly is formed into a flat grip 9a through which pressure is applied for rocking said handle or lever 9 clockwise, as viewed in Figs. 2 and 4. Said lever is supported by an arm 8b of said coil spring which tends to rotate said pivot member counter-clockwise. The forward end 9b of said handle or lever is formed into a nose which bears on the upper inclined surface 6b of the movable jaw member 6. The operative engagement of said nose with said surface 6b limits the rotation of said pivot member is a counter-clockwise direction, and the pressure of said spring is made through said pivot member 10 to the movable jaw.

The pivot member 10 is arranged adjacent said nose 9b, and thus, pressure applied by the nose on said inclined surface 6b is increased by said leverage. Also, said upper inclined surface 6b lies closer to the point at which welding rod 11 is gripped than to pin 7, and, thus, the effective pressure of said spring is increased by this arrangement. It is to be noted that the distance from transverse slot 12 in the face of jaw to the pin 7 is substantial. Thus, the necessary movement of said jaws to open and close and to accommodate welding rod of this diameter involves only a small angular movement about the axis extending through pin 7. The pressure exerted through handle or lever 9 on the movable jaw on the upper surface of the movable jaw member applies sufficient effective force to grip the welding rod effectively in said jaws.

I preferably sheath the jaws and bared end of the electric cable with a tubular insulating member 13. Said member has a slot 13a formed therein, sufficient only to permit the handle or lever 9 to extend therethru. Said slot opens at the end 13b of said member 13 to permit the latter to be slid endwise of the jaw to the position it occupies in the drawing. The insulating member is held in place by a screw 14, shown in Fig. 5. Said jaw, preferably, is provided with annular bosses 15 to engage the bore of the insulating member at spaced, but limited, areas. This construction provides adequate support for the member 13, but does not provide such tight frictional engagement as to prevent said member 13 from being removed when access must be had to the gripping portions of the electrode holder. The jaws of said holder are, preferably, sheathed with tapered semicircular shields 16 and 17, covering the movable and fixed jaws, respectively. Said shields are removably held over said jaws by screws 18 and 18a, respectively. The opposed gripping faces of said jaws are provided with obliquely disposed slots 12a and 12b and a longitudinal slot 12c, so that welding rod may be selectively arranged in any of said slots. This latter structure is commonly provided in the art.

The operation of my device is as follows:

With a piece of welding rod 11 engaged between the two jaws, electric current flows from the cable 4 through the jaws and to said rod. The slots 12 are provided with oblique sides to accommodate various diameters of welding rod to promote good electrical conductivity. When the welding rod is used up, or must be adjusted, the spring pressure applied to the jaws must be relaxed to permit said welding rod to be shifted or removed. This is accomplished by gripping the handle 9 and the external face of the tubular insulating member 13, moving the handle 9 from the position shown in Fig. 2 to the position shown in Fig. 4. This may be done quite easily in an electrode holder embodying my invention, because of the leverage principles previously discussed.

It is necessary to provide a spring 8, which is quite stiff. The parts are arranged, so that they can be gripped easily, and, thus, the full gripping pressure may be utilized for relaxing the pressure on said jaws. When pressure is released, said spring acts through the handle or lever 9 to supply pressure directly on the upper back face of the movable jaw to provide a powerful grip on the electrode.

The operating parts of said electrode holder can be uncovered merely by removing three screws and by removing or sliding the insulating members out of position. The fixed jaw is a through member of generous cross-sectional area, and, thus, carries the electrical current from the cable to the electrode adequately and independently of any wear of the parts. The distance from the pivotal connection of the two jaws to the point at which the electrode is gripped is relatively large, as has been previously commented upon. This arrangement permits the jaws to be spread apart without large angular movement. Thus, various sizes of electrodes may be accommodated without varying the angular arrangement of the jaws more than a couple of degrees of angular rotation. It is to be noted that the jaws, when opened, are held merely by spring pressure, and the effective spring pressure is quite small. Thus, although the parts are held open, as is shown in Fig. 4, by the depression of the handle 9, the jaws may be opened and closed merely by finger pressure to test the contact between any given electrode and any of the slots in the jaws.

I claim:

1. An electrode holder comprising a pair of spring-opened gripping members pivotally joined together, one of said gripping members being relatively fixed and the other being movable, cooperating electrode holding jaws formed upon the adjacent ends of said members, respectively, a manually operable, pivoted handle, spring actuating means therefor, said handle operatively engaging said movable member at a point intermediate its pivotal connection with the fixed member and the jaw formed on the extremity thereof, for applying gripping pressure to close said jaws, the spring actuating means for the handle and the spring opening means for the gripping members being a common member.

2. An electrode holder comprising a pair of spring-opened gripping members pivotally joined together, one of said gripping members being relatively fixed and the other being movable, cooperating electrode holding jaws formed upon the adjacent ends of said members, respectively, a manually operable, pivoted, spring actuated handle operatively engaging said movable member at a point intermediate its pivotal connection with the fixed member and the jaw formed on the extremity thereof, for applying gripping pressure to close said jaws, the spring for actuating the handle and for opening the gripping members being a common member, the spring pressure for opening said gripping members being applied adjacent the pivot axis at a point at one end of said movable member, and pressure for closing said jaws being applied to said movable member at a point at the other side of said pivot axis and spaced substantially from the pivot axis of said handle, thereby to apply the preponderance of the force toward closing said jaws.

MAX S. KENWORTHY.